Aug. 3, 1948.  E. F. ZIEGLER  2,446,450
SYSTEM FOR CONTROLLING LIGHTING CIRCUITS
Filed Nov. 30, 1946 2 Sheets-Sheet 1
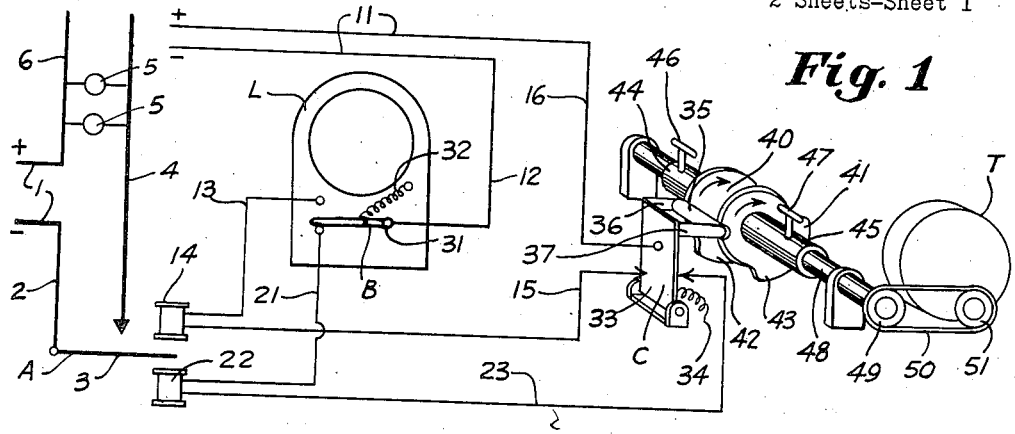
Fig. 1
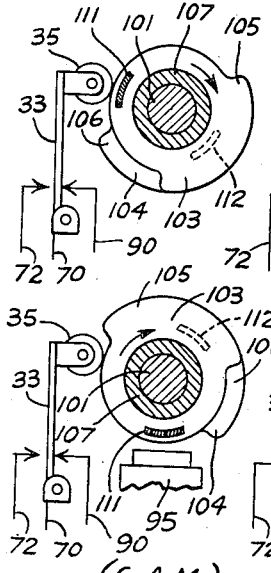
Fig. 2 (12 NOON)
Fig. 6 (6 A.M.)
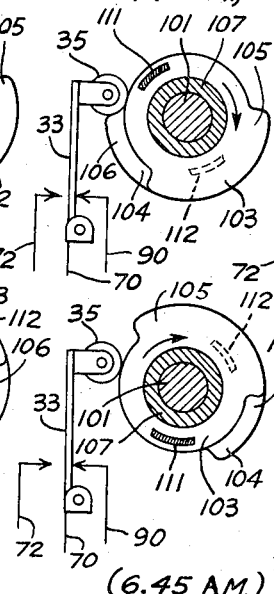
Fig. 3 (4 P.M.)
Fig. 7 (6.45 A.M.)
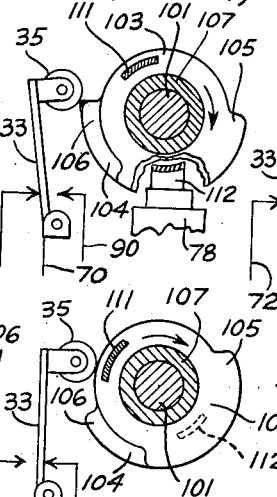
Fig. 4 (4.30 P.M.)
Fig. 8 (11.30 A.M.)
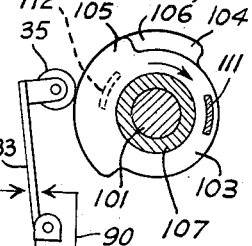
Fig. 5 (12 MID.)
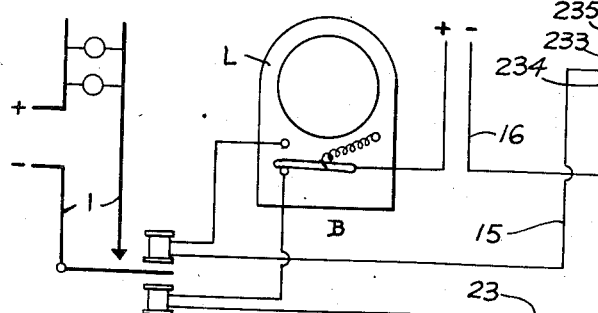
Fig. 9
INVENTOR
Edward F. Ziegler
BY Pearson + Pearson
ATTORNEYS Aug. 3, 1948.　　　　　E. F. ZIEGLER　　　　　2,446,450
SYSTEM FOR CONTROLLING LIGHTING CIRCUITS
Filed Nov. 30, 1946　　　　　　　　　　　　2 Sheets-Sheet 2
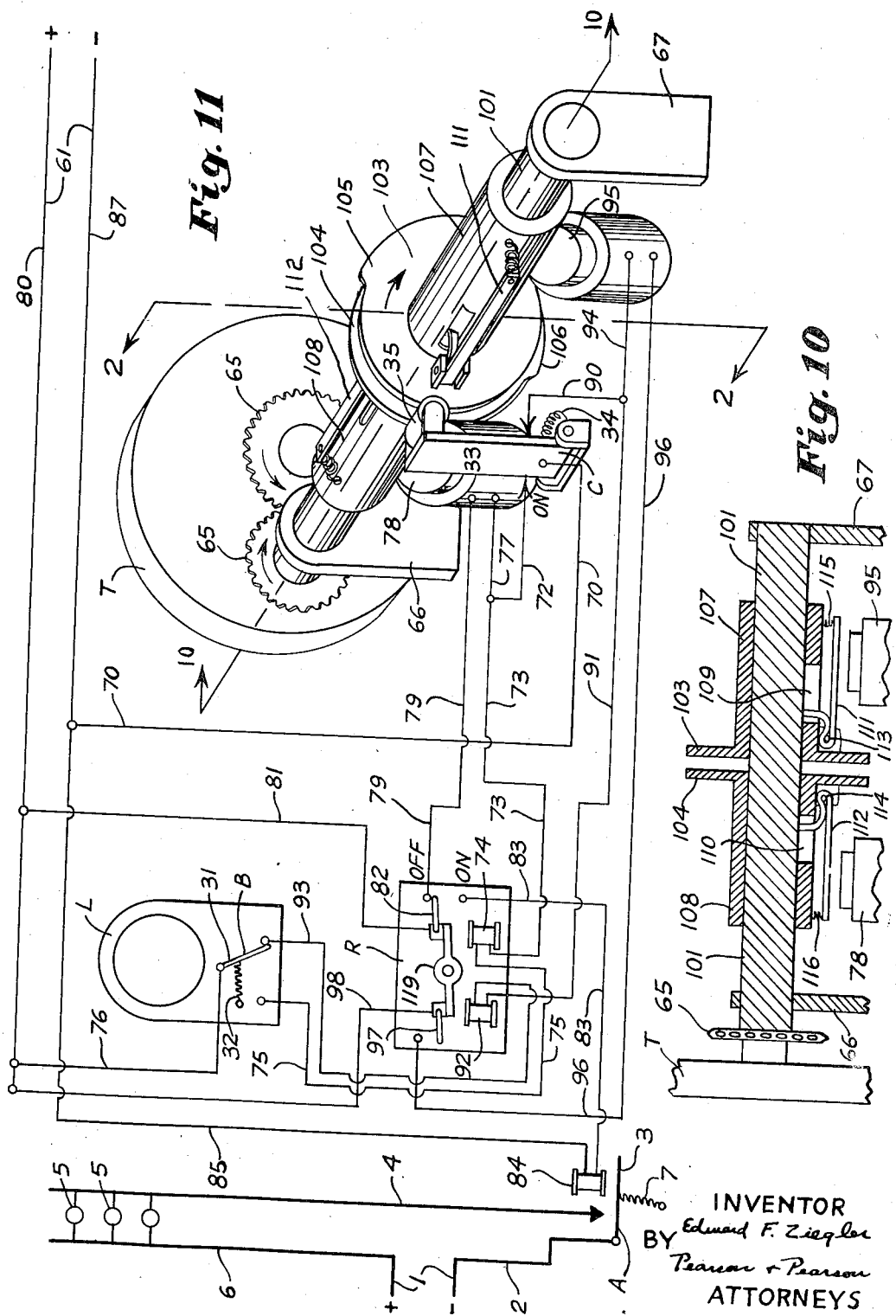
INVENTOR
Edward F. Ziegler
BY Pearson & Pearson
ATTORNEYS Patented Aug. 3, 1948

2,446,450

UNITED STATES PATENT OFFICE 2,446,450

SYSTEM FOR CONTROLLING LIGHTING CIRCUITS

Edward F. Ziegler, Reading, Mass.

Application November 30, 1946, Serial No. 713,246

15 Claims. (Cl. 315—159)

This invention relates to electric illumination systems controlled by light sensitive devices, such as a photo-electric tube or cell, the period of operation of such light sensitive device being automatically determined by timing mechanism.

It has been customary in outdoor street lighting to use a main electric circuit comprising street lights, a source of power such as a central generating station and a switch. It has also been customary to use in association with the main circuit a secondary or control circuit including a relay which operates the switch in the main circuit; a switch in the control circuit actuated by a light sensitive device in accordance with variations in natural light intensity and a source of power for the control circuit such as a shunt from the main circuit.

The light sensitive device is usually directed at the northern sky and is so adjusted that, as natural light intensity falls below a preselected level, the light sensitive device moves its control circuit switch to the "on" position, thereby energizing the control circuit relay whereupon the latter switches on the main lighting circuit. In the early morning, as natural light intensity rises to the preselected level the light sensitive device moves its control circuit switch to the "off" position, de-energizing the control circuit relay and thereby switching off the street lights.

Light sensitive devices used in such systems may consist of a photo-electric tube, powered by the main circuit or powered from the control circuit. They are usually, however, a well known type of photo-electric cell wherein the light sensitive substance itself produces varying electric current in accordance with the intensity of light to which it is exposed.

It has been found in practice that electric illumination systems, as described above, are subject to errors in operation. A light sensitive device, located outdoors may be obscured during the daytime by an article carelessly thrown over it. This will cause the street lighting circuit to be energized and create a hazard for men working on the electric lines and will waste electric power. During the hours of darkness, a bright searchlight beam or auto headlight, a flash of lightning in the distance or a fire in the immediate vicinity may cause the light sensitive device to switch off the street lighting over a large area and thereby create an even more dangerous condition.

One of the objects of my invention is to overcome these errors in operation and to provide a more positive and accurate lighting control system. In its simplest form my device assures that street lights will not be illuminated or extinguished at obviously wrong times. It further assures that street lights will be illuminated after a preselected time in the afternoon, will remain illuminated for a certain number of hours will be extinguished after a preselected time in the morning and remain extinguished for the remaining portion of the twenty-four hours.

I use the customary main circuit and add to the customary control circuit, specified above, what I call a "time" switch which permits the light sensitive device to function only twice each day, once to switch on lights and once to switch off lights. My new control circuit consists of a relay with opposed coils for switching on or off the switch of the main circuit, a first switch actuated by the light sensitive device which I call the "light" switch, a second switch actuated by timing mechanism, called the "time" switch, and a source of electromotive power.

My time switch is a contact arm pivoted so that it can be moved to the "on" or "off" position by timing mechanism. My light switch is also a contact arm pivoted so that it can be moved to the "on" or "off" position by the light sensitive device. The control circuit moves the switch controlling the main circuit to the "on" position, only when both the time switch and the light switch are in the "on" position. Similarly, the control circuit moves the switch controlling the main circuit to the "off" position, only when both the light switch and the time switch are in the "off" position.

In one form of my device I provide a timing shaft revolubly connected to clock work mechanism and carrying two concentric disc shaped cams, of the well known "plate" type, one of which I call the "dusk" cam and the other of which I call the "dawn" cam. The contact arm of my time switch bears against the circumferential edge of both cams whereby it assumes the "on" position when the raised portion of the cam edge is in contact and assumes the "off" position when the unraised position is in contact.

I set my timing shaft to complete a revolution every twenty-four hours and affix the dusk cam thereto so that its raised circumferential edge will strike the time switch at a daily time such as four-thirty P. M. I may use a circumferential length of raised portion on the dusk cam sufficient to hold the time switch in the "on" position for eight hours. I may affix my dawn cam to the time shaft so that its raised portion will be flush with and a prolongation of that of the dusk cam. The combined circumferential length of raised portion of the two cams can thus be adjusted whereby the trailing edge of the dawn cam's raised portion will allow the time switch to move to the "off" position at some desired time such as five-thirty in the morning.

In operation, my timing cams revolve on the time shaft and, at the appropriate time, the dusk cam actuates the time switch to the "on" position. After the time switch assumes the "on" position, the subsequent response of the light sensitive device, at a time it selects as appropriate, completes the control circuit, energizes the coil of the control circuit relay and street lights are switched on by the switch controlling the main circuit. The street lights will remain on throughout the night, despite any responses of the light-sensitive device, because the time switch is held in the "on" position by the raised portion of my two cams as they revolve. The switch of the main circuit can be moved to the "off" position only by energization of the opposite coil of the control circuit relay which cannot take place until the time switch moves to the "off" position.

In its simplest form, therefore, my device, overcomes the operational errors caused by mistakes of the light sensitive device in reacting to abnormal or unusual light intensities. However, the timing mechanism described above requires occasional manual adjustment to adapt it to the changing seasons of the year and therefore is not fully automatic.

The preferred form of my device is however completely self-sufficient and needs no manual adjustment to operate accurately every day of the year. To explain its operation it is pointed out that in addition to the occasional untimely responses of the light sensitive device, mentioned above, there are certain variables in natural conditions which affect the proper time for switching on or off of street lights. In order to be fully automatic each day, a lighting system must take such variables into consideration and be capable of adjusting itself to them.

One of the variables is the progressive daily variation caused by the space relationship of the earth and the sun whereby sunset and sunrise may occur a few minutes earlier each day during certain seasons and a few minutes later each day in the remaining seasons of the year. Another variable is the presence or absence of dark storm clouds, caused by the weather, which may cause natural light intensity to be higher or lower than normal. In a particular geographical location, I can determine the time interval necessary to provide for these two variables and for convenience in describing my invention, it will be assumed that thirty minutes is sufficient and is decided upon.

In this preferred form of my invention, I use the main circuit and control circuit as described above, including a switch actuated by a light sensitive device and a switch actuated by timing cams. Instead of a timing shaft which revolves once every twenty-four hours, however, I use a shaft capable of being adjusted to complete one revolution in a time less than twenty-four hours.

To allow for the variables previously mentioned, for which it was assumed that thirty minutes would be sufficient time allowance, I adjust my time shaft to complete a revolution in twenty-three and one-half hours. This leaves a thirty minute period remaining from a twenty-four hour day and is what I call the "leeway." It is provided to make the light sensitive device ready to operate each day approximately thirty minutes before it would normally be called upon to operate.

A dusk cam and a dawn cam are carried by the timing shaft, the circumferential edge of both cams bearing against the contact arm of a time switch and moving it to the "on" position when the raised portion of the cam is in contact and permitting it to move to the "off" position when in contact with unraised portions of the cam edge. These cams however are not permanently fixed to the time shaft but are connected thereto only by a spring pressed member attached to the cam but in frictional contact with the shaft.

I provide a magnet proximate to the spring pressed member of each cam which I call a "magnetic cam stop." When this magnet is energized, it pulls the spring pressed member out of frictional contact with the timing shaft and holds the cam stationary while the shaft continues to revolve. My control circuit is so arranged that as soon as the dusk cam moves the time switch to the "on" position and as soon as the dawn cam permits the time switch to resume the "off" position, each cam is halted in place by its magnetic cam stop. Neither cam can again resume revolving with the time shaft until the light sensitive device makes a response, thereby de-energizing the magnetic cam stop.

An additional feature of the preferred form of my invention is the provision of switching means in the control circuit, which I call the "operating relay." The operating relay comprises an armature pivoted at the centre and actuated by two magnetic coils each energized by separate subordinate circuits of the control circuit. The armature of the operating relay is of a well known toggle joint type, whereby, when moved to one position by the energization of a coil, it remains in that position after the coil is de-energized. It does not again move to its other position until the opposite coil is energized.

To illustrate how my timing mechanism operates, a normal day will be taken as an example. It will lso be assumed that in the particular geographical location thirty minutes is a sufficient "leeway" to cover variations from the normal in weather and to cover the daily progressive change in the time of sunset and sunrise.

If darkness will normally commence on this normal day at five o'clock in the afternoon, the dusk cam of my device will move the time switch to the "on" position thirty minutes earlier than five o'clock or at four-thirty o'clock. The control circuit is then ready for complete closing at whatever time after four-thirty o'clock, the light sensitive device determines is appropriate.

Since this is a normal day, the intensity of natural light will fall to the preselected level at five o'clock, which causes the light sensitive device to move its switch in the control circuit to the "on" position. This completes the control circuit, energizes the control circuit relay, moves the main circuit switch to the "on" position and the street lights are illuminated.

According to my device, however, although when the dusk cam moved the time switch to the "on" position, it was connected to the timing shaft, immediately thereafter a subordinate circuit was completed which energized the magnetic cam stop and caused the dusk cam to become stationary. The timing shaft continued to revolve as did the dawn cam which therefore began to reduce the circumferential distance between the forward edge of the raised portion of the dusk cam and the trailing edge of the raised portion of the dawn cam.

The dusk cam remained stationary for thirty minutes on this normal day from four-thirty o'clock to five o'clock waiting for the light sensitive device to respond. As soon as that response occurred, at five o'clock, the magnetic stop was de-energized and the spring pressed member of the dusk cam caused it to again commence revolving with the timing shaft. It will be seen that twenty-three and one-half hours after five o'clock the dusk cam will again be in position to move the time switch to the "on" position at four-thirty o'clock the following day.

If the day had not been normal and it had been dark and cloudy at four-thirty o'clock, the light sensitive device might have responded to the lowered light intensity at four-forty-five o'clock rather than five o'clock. Had this been the case, the dusk cam would have recommenced revolving with the timing shaft at four-forty-five o'clock and on the next day would have been in position to move the time switch to the "on" position fifteen minutes earlier than the day before or at four-fifteen o'clock.

On the other hand, if the day had been unusually bright, the light sensitive device might not have responded until later than the normal time as at five-fifteen o'clock or such later time as it deemed appropriate. Thus my dusk cam would not have recommenced revolving with the time shaft until five-fifteen o'clock and on the next day would have moved the time switch to the "on" position fifteen minutes later than the day before or at four-forty-five o'clock.

In any case, according to my device it is the time of response of the light sensitive device each day which resets my timing cams ready for operation at a stated interval such as twenty-three and one-half hours afterward on the following day. The dawn cam operates in the same manner as the dusk cam, being held stationary by its magnetic stop until the light sensitive device makes a response whereupon the dawn cam again resumes revolving with the timing shaft.

Since the operating relay of my device cannot be moved from the "on" position, until after the time switch initiates a move to the "off" position in the morning, the street lights cannot be extinguished during darkness. The time switch cannot initiate such a movement to the "off" position during the hours of darkness because it is held in the "on" position by the raised portions of the dusk and dawn cams.

In a similar manner, so long as the time switch bears against the unraised portion of my timing cams, there is no possibility of the street lights being illuminated, during the hours of daylight.

In the lower latitudes, between about 30° N. and 30° S., I prefer to use cams whose circumferential raised portion amounts to about 120° or approximately eight hours in time, the total combined length of raised portion of both dusk and dawn cam ranging from a maximum of sixteen hours to a minimum of eight hours.

However, in higher latitudes I may use cams whose raised portion covers 180° or more of the circumference depending on the maximum time range required by the geographical location. In this case I use two separate snap action contact arms in my time switch to act as cam followers for each cam and modify my electrical connections as shown in Fig. 9. The increased amount of overlap, of the raised portion of my dusk and dawn cams, necessitated by the higher latitudes, makes the use of a single contact arm impractical in these latitudes. It is obvious that I can use two contact arms in place of the single contact arm shown in the preferred construction of my time switch, and that the time switch would thus be usable in all latitudes.

If it is determined, that in a particular geographical location, a period of two hours is necessary to account for variations from the normal in the time of twilight and dawn, I may adjust my time shaft to complete a revolution in twenty-two hours, by substituting an appropriate ratio of gearing between my time shaft and my clock mechanism.

I prefer to use an independently powered clock mechanism such as a spring clock wound by periodic electric impulses to avoid errors in timing due to stoppage of power. Thus, if the source of power in the control circuit fails temporarily, my timing mechanism will continue to function and, upon resumption of the power, will rapidly restore the proper cycle of timing automatically.

I also prefer to use a photo-electric cell of a well known type, which, upon malfunction, automatically moves its switch in the control circuit to the "on" position. Thus, the control circuit will be closed as soon as the timing mechanism moves its switch to the "on" position and the street lights will be illuminated. In such cases, the street lights will continue burning until the trouble in the photo-electric cell has been corrected.

My invention accommodates a wide range in the time of commencement of darkness on succeeding days. If for a certain locality, the maximum daily variation is determined to be thirty minutes, then the device insures that lights can be switched "on" up to thirty minutes earlier than the actual switching "on" time of the preceding day. No limit is placed on how much later, each day, the lights may be switched "on." In any case, the actual time of switching lights "on" is always determined by the photo-electric cell.

Similarly, there is a wide range in the time of ending of darkness on succeeding days, the actual time of switching lights "off" being always determined by the photo-electric cell.

In the drawings,

Figure 1 is a diagrammatic view of my device,

Figure 2 is a sectional view on line 2—2 of Figure 11, showing the timing cams and time switch of a preferred form of my device.

Figures 3 to 8 are sectional views, similar to Figure 2, showing the position of the cams and time switch at various hours of the day.

Figure 9 is a view similar to Fig. 1 showing the use of two snap action contact arms in the time switch when the device is used in higher latitudes.

Figure 10 is a sectional view on line 10—10 of Figure 11, showing the timing cams and the magnetic cam stops of a preferred form of my device, and Figure 11 is a diagrammatic view of a preferred form of my device.

As illustrated in Figure 1, I use the customary main electrical circuit 1, including a source of electromotive power not shown, which may be a central electric generating station. Electric lighting units 5, 5 are included in circuit 1, and I provide a switch A with an armature 3 for switching on or off the main circuit. When armature 3 is closed, that is in the "on" position, a circuit is made through wire 6, electric units 5, wire 4, armature 3 and wire 2, thus illuminating the streets or other outdoor area in which the system is installed.

I also provide a control circuit 11, with an independent source of electromotive power such as electric batteries, although the control circuit may be powered by a shunt from the main circuit 1, in a well known manner. Included in the control circuit 11 is a relay coil 14 for moving armature 3 of main circuit 1 to the "on" position and a relay coil 22 for moving it to the "off" position. Switch A is of the toggle joint type and remains in its last position until the opposite coil is energized.

L is a light sensitive device, such as a photoelectric cell, directed at the northern sky so that as natural light intensity rises to a preselected level it actuates contact arm 31 of a switch B in the control circuit. I call switch B the "light" switch in the control circuit. Contact arm 31 is provided with a spring 32 to hold it in the "on" position except when the brightness of daylight influences cell L to move it to the "off" position.

C is what I call the "time" switch in the control circuit with a contact arm 33 movable to the "on" or "off" position by means of disc like timing cams 40 and 41. Contact arm 33 is provided with a spring 34 which maintains it in contact with the timing cams. A roller 35 carried by arms 36 and 37 of contact arm 33 permits the cams 40 and 41 to revolve without undue friction from contact arm 33.

Timing cam 40 is what I call the "dusk" cam and timing cam 41 is what I call the "dawn" cam. Each is of disc shape, with a portion of the circumference at 42 and 43 of such increased radius that the circumferential edge will move 33 to the "on" position, while the portion of smaller radius permits spring 34 to move 33 to the "off" position. Each cam 40 and 41 is carried by a tubular shank 44 and 45 bearing set screws 46 and 47 for affixing the cams to timing shaft 48.

Timing shaft 48 carries a pulley 49 connected by a belt 50 to the power pulley 51 of timing mechanism T, in such manner that shaft 48 completes one revolution every 24 hours.

In the operation of my device, I may affix my dusk cam 40 to shaft 48 by means of set screw 46, so that the raised portion 42 will strike roller 35 of contact arm 33 at a time such as four-thirty in the afternoon. Contact arm 33 is thus moved to the "on" position and the control circuit is ready for the light sensitive device L to operate. At an appropriate time after four-thirty when natural light intensity falls below a level preselected thereon the cell L permits contact arm 31 of switch B to be moved to the "on" position by spring 32.

A circuit is thus completed through wire 16, contact arm 33, wire 15, relay coil 14, wire 13, contact arm 31 and wire 12. The energization of relay coil 14, causes it to move armature 3 of switch A to the "on" position, thus closing the main circuit, energizing lights 5, 5 and illuminating the streets. Switch A will remain in the "on" position, until such time as the time switch C initiates a move to energize relay coil 22 by moving to the "off" position.

I affix the dawn cam 41 to shaft 48 by tightening set screw 47, whereby the raised circumferential edge 43 will be in prolongation of raised circumferential edge 42 of cam 40. I can adjust the combined raised portion of the two cams so that the trailing edge of 43 will permit contact arm 33 to assume the "off" position at a time such as five-thirty in the morning. Upon this occurrence the control circuit becomes ready for the light sensitive device L to again operate.

At an appropriate time after five-thirty the natural light intensity will rise to the preselected level representing daylight and contact arm 31 of switch B will be moved to the "off" position by the light sensitive device L against the pull of spring 32.

A circuit is thus completed through wire 16, contact arm 33, wire 23, relay coil 22, wire 21, contact arm 31 and wire 12. The energization of relay coil 22 causes it to move armature 3 of switch A to the "off" position, opening the main circuit 1 and extinguishing all street lights.

It will be seen that with my device, the street lights 5 can never be illuminated unless the light switch B and time switch C are in the "on" position. Once illuminated, street lights 5 cannot be extinguished until time switch C moves to the "off" position. And once extinguished street lights 5 cannot be illuminated until time switch C moves to the "on" position. Yet the actual time at which lights 5 are turned on or off is determined by the light sensitive device.

By affixing my cams 40 and 41 in the proper positions on shaft 48, I can establish an appropriate time range for a particular locality which will be correct for a month, for a season or for the entire year. However, the period between the moment the time switch actuates and the moment the light switch actuates, must be of greater length, the greater the number of days the device is to operate without additional manual adjustment.

The cams shown in all of the figures, with the exception of Figure 9, are suitable for latitudes between approximately 30° N. and 30° S. As shown in Figure 9, however, in higher latitudes I may use cams whose raised portion is more than 120° of the circumference, such as dusk cam 240 and dawn cam 241 having raised portions 242 and 243 respectively. Cams 240 and 241 have tubular shanks 244 and 245 which may be attached to shaft 48 by set screws 246 and 247 or by magnetic cam stops such as are shown in Figures 10 and 11 in the preferred form of my invention.

To facilitate the use of cams 240 and 241, with the increased length in the raised portion of their edges, I provide two contact arms 233 and 333 in my time switch to act as spring pressed cam followers. Each contact arm 233 and 333 has a return spring 234 and 334 and carries a roller 235 and 335 in contact with the edges of cams 240 and 241.

When rollers 235 and 335 are in contact with the unraised edge of cam 240 and 241 the circuit between wires 16 and wires 15 and 23 is broken. As raised portion 242 of cam 240 bears against roller 235, contact arm 233 completes a circuit between wires 16 and 15 and, similarly, raised portion 243 causes contact arm 333 to complete a circuit of wires 16 and 23.

The operation of the device shown in Figure 9 is the same as that shown in Figure 1, but permits a period of darkness or a period of light of considerably greater extent. If raised portion 242 is 180° or 12 hours in length it will close contact arm 233 for 12 hours, for example between 4 P. M. and 4 A. M. The cell L will complete the closing of the control circuit at the appropriate time, thus illuminating the streets and the main circuit will remain closed during the 12 hours.

The raised portion 243 of cam 241, being also 180° in length or 12 hours will close contact arm 333 at about 4 A. M. and hold it closed until 12 hours later at 4 P. M. During this time cell L will again close the control circuit to extinguish the street lights and will keep the control circuit closed during the 12 hours.

It is apparent that two contact arms may also be used in the time switch shown in Figures 10 and 11 in place of the single contact arm 33 where the preferred form of my device is to be used in higher latitudes.

In a preferred form of my device, shown in Figures 2-3 and Figures 10 and 11, I provide means to automatically adjust the timing to accord with the constantly changing time of darkness and daylight throughout the days of the year. The device is therefore fully automatic and capable of readjusting itself to the correct time cycle after a failure of power in the control circuit. It may be used for electric outdoor illumination including street lighting, airway beacons, lighted buoys, lighthouses and similar installations with no manual adjustment necessary at any time.

In this preferred application of my invention, as shown in Fig. 11, I use the customary main circuit 1, comprising wire 2, armature 3 of switch A, wire 4, lighting units 5, 5, and wire 6, as described above. A spring 7 is provided to pull armature 3 to the "off" position when relay coil 84 is not energized. Relay coil 84 is included in control circuit 61 and when energized, moves armature 3 to the "on" position, thereby closing the main circuit 1 and illuminating lighting units 5, 5.

A light sensitive device, preferably a photoelectric cell L is provided with a switch B having a contact arm 31, which I call the light switch. Spring 32 holds contact arm 31 in the "on" position except when the level of natural light intensity rises sufficiently to cause L to actuate 31 to the "off" position.

A switch C, having a contact arm 33 which I shall call the time switch is also provided, there being a spring 34 for maintaining contact arm 33 in contact with my timing cams.

Clock mechanism T is preferably of the spring type, wound by periodic electric impulses received from control circuit 61, and is connected in any convenient way, such as by gears 65, to timing shaft 101. As shown timing shaft 101 revolves in bearings 66 and 67 and carries a dusk cam 104 with its tubular shank 108 and a dawn cam 103 with its tubular shank 107.

As shown more clearly in Figure 10, each cam 103 and 104 has a slot 109 and 110 in its shank 107 and 108 and each cam carries an L-shaped lever 111 and 112 pivoted at 113 and 114 to cams 103 and 104. Springs 115 and 116 hold members 111 and 112 in frictional contact with shaft 101 thereby causing the cams 103 and 104 to revolve with shaft 101.

I provide what I call a magnetic cam stop, however, which comprises magnetic coils 95 and 78. The energization of coils 95 and 78 pulls members 111 and 112 out of frictional contact with shaft 101 and causes cams 103 and 104 to cease revolving until the magnetic coils are deenergized.

R is what I call the "operating relay" comprising a pivoted armature 119, bearing contact arms 82 and 97 and movable to two positions by relay coils 74 and 92. Relay R is of the well known toggle joint type wherein armature 119 remains in a particular position until the opposite coil is energized and in which there are auxiliary contacts which open each coil circuit immediately after operation.

If it is desired that the light sensitive device be ready to function, thirty minutes before the usual time of darkness and daylight, I adjust my time shaft 101 to complete one revolution in twenty-three and one-half hours. This "leeway," as I call it, permits time switch C to actuate ahead of light switch B so that when B is ready to function the control circuit will always be ready.

In the positions shown in Figure 11 and in Figure 2, the time is approximately 12 noon. Both the light switch B and time switch C are in the "off" position, switch A is open and street lights 5 are extinguished. However, shaft 101 is being revolved by clock mechanism T and carrying with it dusk cam 104 and dawn cam 103.

As shown in Figure 3, at about four o'clock in the afternoon of a typical day, the leading edge of the raised portion 106 of dusk cam 104 has just reached the roller 35 of contact arm 33.

As shown in Figure 4, at four-thirty in the afternoon, the raised portion 106 of dusk cam 104 has moved contact arm 33 from the "off" to the "on" position. Simultaneously a circuit is completed through wire 87, wire 70, contact arm 33, wire 72, wire 77, magnetic coil 78, wire 79, contact arm 82, wire 81 and wire 80. The energization of magnetic coil 78, attracts lever 112 thus halting cam 104, while shaft 101 and cam 103 continue revolving.

My control circuit is now what I call "vulnerable" and as far as the time switch is concerned is ready to switch on the main electric lighting system. Since the day is normal, and the leeway is thirty minutes, the light sensitive device L will respond to the arrival of darkness at about five o'clock in the afternoon by permitting contact arm 31 of switch B to move to the "on" position.

By so doing, a new circuit is made through wire 80, wire 76, contact arm 31, wire 75, relay coil 74, wire 73, wire 72, contact arm 33, wire 70 and wire 87. The energization of coil 74 of operating relay R attracts armature 119 causing contact arm 82 to make another circuit. This circuit from wire 80, wire 81, contact arm 82, wire 83, relay coil 84, wire 85 and wire 87 causes relay coil 84 to be energized. Relay coil 84 attracts armature 3 of switch A thereby closing main circuit 1 and illuminating street lights 5.

The movement of contract arm 82, simultaneously broke the circuit which energized magnetic coil 78 which thereupon released lever 112 and permitted cam 104 to recommence revolving with time shaft 101. Cam 104 was thus halted for about thirty minutes waiting for cell L to make a response. Having commenced revolving again it will arrive in the same position twenty-three and one-half hours later and will again give cell L a leeway of thirty minutes. It will be seen that whether cell L responds at four-fifteen or five-forty-five or some other time, cam 104 will continue to give it thirty minutes leeway on the next day, based on the time of response of the previous day.

It will also be seen that once contact arm 82 has closed the circuit which energizes relay coil 84, main circuit 1 will remain energized until contact arm 82 is again moved. 82 cannot move until opposite relay coil 92 actuates armature 119 and this cannot occur so long as contact arm 33 is held in the "on" position by the raised portions 105 and 106 of timing cams 103 and 104. Thus there is no possibility of the electric lighting units being extinguished during the hours of darkness, in spite of any action of cell L.

While cam 104 was halted during the leeway period, cam 103 was revolved by the time shaft 101 and therefore the total circumferential length of raised portions 105 and 106 was shortened. After the halt and during the night both cams continue revolving and continue holding contact arm 33 in the "on" position as shown in Figure 5 which is illustrative of midnight positions.

As shown in Figure 6, the raised portions 105 and 106 of cams 103 and 104 have revolved sufficiently at about six o'clock in the morning to enable the trailing edge of 105 to pass roller 35 of contact arm 33. Contact arm 33 of switch C, therefore, is moved to the "off" position by spring 34. Simultaneously a circuit is made from wire 87, wire 70, contact arm 33, wire 90, wire 94, magnetic coil 95, wire 96, contact arm 97, wire 98 and wire 80. This circuit energizes magnetic coil 95 which therefore attracts lever 111 of dawn cam 103, and causes cam 103 to cease revolving with time shaft 101.

Cam 104, however, continues to revolve with time shaft 101 thus gradually lengthening the total circumferential length of raised portions 105 and 106.

Since the day is assumed to be typical, cam 103 will be held in position about thirty minutes during which time my control circuit is again what I call "vulnerable." The time switch is ready and is waiting for the light switch to respond. At the end of the leeway period of thirty minutes, at about six-thirty o'clock in the morning, photoelectric cell L will respond to the arrival of daylight by moving contact arm 31 of switch B to the "off" position. It is pointed out however, that if the day is abnormal, such as if dark clouds are present the light switch may not respond until six-forty o'clock or such later time as it deems appropriate.

In any case the moving of contact arm 31 to the "off" position closes a circuit from wire 80, wire 76, contact arm 31, wire 93, relay coil 92, wire 91, wire 90, contact arm 33, wire 70 and wire 87. The energization of relay coil 92 moves armature 119 to the position shown in Figure 11, thus causing contact arm 82 to break the circuit which energized relay coil 84 and thus extinguishing the electric lights 5.

The movements of contact arm 97 simultaneously breaks the circuit which energized magnetic coil 95, whereupon magnetic coil 95 releases lever 111 and permits cam 103 to recommence revolving with time shaft 101. Thus cam 103 will be in position twenty-three and one-half hours later to again permit contact arm 33 to move to the "off" position. Both cams 103 and 104 are shown as revolving together on shaft 101, at about six-forty-five o'clock in the morning in Figure 7.

In Figure 8, I show both my dusk cam 104 and my dawn cam 103 as having revolved sufficiently at eleven-thirty o'clock in the morning to be ready to again perform the cycle just described. It should be noted that so long as contact arm 33 is in contact with the unraised portion of cams 103 and 104, any incorrect response of cell L to unusual light intensities will not affect the main circuit or cause it to be energized during the daytime.

I claim:

1. A circuit control apparatus including a light sensitive device, a first switch in said circuit actuated by the light sensitive device according to variations in natural light intensity, a second switch in said circuit, timing mechanism for actuating said second switch including means for automatically establishing the time of day after which responses of the light sensitive device control the circuit.

2. In a system for the daily control of electrical outdoor illumination, an electric lighting circuit controlling said circuit, a light sensitive device controlling said circuit, timing mechanism controlling the time of operation of said light sensitive device and mechanism for advancing or retarding said time of operation in accordance with seasonal variations in duration of natural daylight and darkness.

3. In a system for the daily control of electrical outdoor illumination, an electric lighting circuit, a light sensitive device for controlling said circuit, timing mechanism for establishing a time after which said light sensitive device can control the circuit and mechanism for advancing or retarding said control time in accordance with daily variations in the actual time said light sensitive device responds at predetermined levels of natural light intensity.

4. In a system for the daily control of electrical outdoor illumination, a main circuit including a source of electromotive power and an electric unit in circuit therewith; a control circuit including a relay for controlling the main circuit; and means for actuating said control circuit relay by a light sensitive device influenced by variations in natural light intensity only after times determined by a time clock.

5. In a system for the daily control of electrical outdoor illumination, a main circuit including a source of electromotive power and an electric unit in circuit therewith; a control circuit including a relay for controlling the main circuit; means for actuating said control circuit relay by a light sensitive device influenced by variations in natural light intensity after times determined by a time clock and means for preventing actuation of said control circuit relay by said light sensitive device at all other times.

6. In a system for the daily control of electrical outdoor illumination, a main circuit including a source of electromotive power and an electric unit in circuit therewith; a control circuit including a relay for controlling the main circuit; means for actuating said control circuit relay by a light sensitive device influenced by variations in natural light intensity during a time period which commences at a preselected interval after a previous actuation and ends with the occurrence of such actuation.

7. In a system for the daily control of electrical outdoor illumination, a main circuit including a source of electromotive power and an electric unit in circuit therewith, a control circuit including an independent source of electromotive power and a relay for controlling the main circuit; and means for actuating said control circuit relay by a light sensitive device influenced by variations in natural lght intensity only after times determined by a time clock.

8. In a system for the daily control of electrical outdoor illumination, a main circuit including a source of electromotive power and a lighting unit in circuit therewith; a control circuit including a relay which controls the main circuit; a light sensitive device; a first switch in the control circuit actuated by the light sensitive device in accordance with variations in natural light intensity; a second switch in the control circuit;

and timing mechanism for actuating said second switch including means whereby the control circuit relay may be actuated by the light sensitive device only after times determined by the timing mechanism.

9. In a system for the daily control of electrical outdoor illumination, a main circuit including a source of electromotive power and a lighting unit in circuit therewith; a control circuit including a relay which controls the main circuit; a light senstive device; a first switch in the control circuit actuated by the light sensitive device in accordance with variations in natural light intensity; a second switch in the control circuit; and timing mechanism for actuating said second switch including means whereby the control circuit relay may be actuated by the light sensitive device only after times determined by the timing mechanism and also means operable by the light sensitive device for resetting the timing mechanism for its next operation at a predetermined time interval after an actuation of the first switch by the light sensitive device.

10. In a system for the daily control of electrical outdoor illumination, a main circuit including a source of electromotive power and a lighting unit in circuit therewth; a control circuit including a relay for controlling the main circuit; a light sensitive device; a first switch in the control circuit actuated by the light sensitive device in accordance with variations in natural light intensity; a second switch in the control circuit; timing mechanism for actuating said second switch at a pre-selected interval after the actuation of the first switch.

11. In a system for the daily control of electrical outdoor illumination, a main circuit including a source of electromotive power and a lighting unit in circuit therewith; a control circuit including a relay for controlling the main circuit; a light sensitive device; a first switch in the control circuit actuated by the light sensitive device in accordance with variations in natural light intensity; a second switch in the control circuit; and timing mechanism for actuating the second switch at times determined by the time of commencement of daylight and darkness on the previous day.

12. In a system for the daily control of electrical outdoor illumination, a main circuit including a source of electromotive power and a lighting unit in circuit therewith; a control circuit including a relay for controlling the main circuit; a light sensitive device; a first switch in the control circuit actuated by the light sensitive device in accordance with variations in natural light intensity; a second switch in the control circuit; and timing mechanism for actuating the second switch at a preselected interval after an actuation of the first switch and means for adjusting the length of said interval to accord with the geographical location of the system.

13. In a system for the daily control of electrical outdoor illumination, a main circuit including a source of electromotive power and a lighting unit in circuit therewith; a control circuit including a relay for controlling the main circuit; a light senstive device; a first switch in the control circuit actuated by the light sensitive device in accordance with variations in natural light intensity; a second switch in the control circuit; and timing mechanism which actuates the second switch at a predetermined period of time before daylight and darkness each day; the time of commencement of said period being at a predetermined interval after the time of occurrence of daylight and darkness on the previous day; and means operable by said light sensitive device for resetting the timing mechanism for its next cycle of operation.

14. In a system for the daily control of electrical outdoor illumination, a main circuit including a source of electromotive power, lighting units and a switch; a control circuit including a relay for moving the main circuit switch to the "off" and "on" position; a light sensitive device, a first switch in the control circuit spring pressed to the "on" position but movable to the "off" position by the light sensitive device when influenced by the intensity of natural light thereon; a second switch in the control circuit and timing mechanism for moving said second switch to the "off" and "on" position at times of day determined by the time of occurrence of daylight and darkness on the previous day.

15. In a system for the daily control of electrical outdoor illumination; a main circuit including a source of electromotive power and a lighting unit in circuit therewith; a control circuit including a relay which controls the main circuit; a light sensitive device, a first switch in the control circuit actuated by the light sensitive device in accordance with variations in natural light intensity; a second switch in said control circuit and independently powered timing mechanism for actuating said second switch at times determined by the time of occurrence of daylight and darkness on the previous day.

EDWARD F. ZIEGLER.